April 27, 1943.                G. R. VINSONHALER                2,317,567
                                    PLOW
                            Filed Nov. 3, 1941           3 Sheets-Sheet 1

INVENTOR:
GEORGE R. VINSONHALER

BY Edgar H. Kent
        ATTORNEY

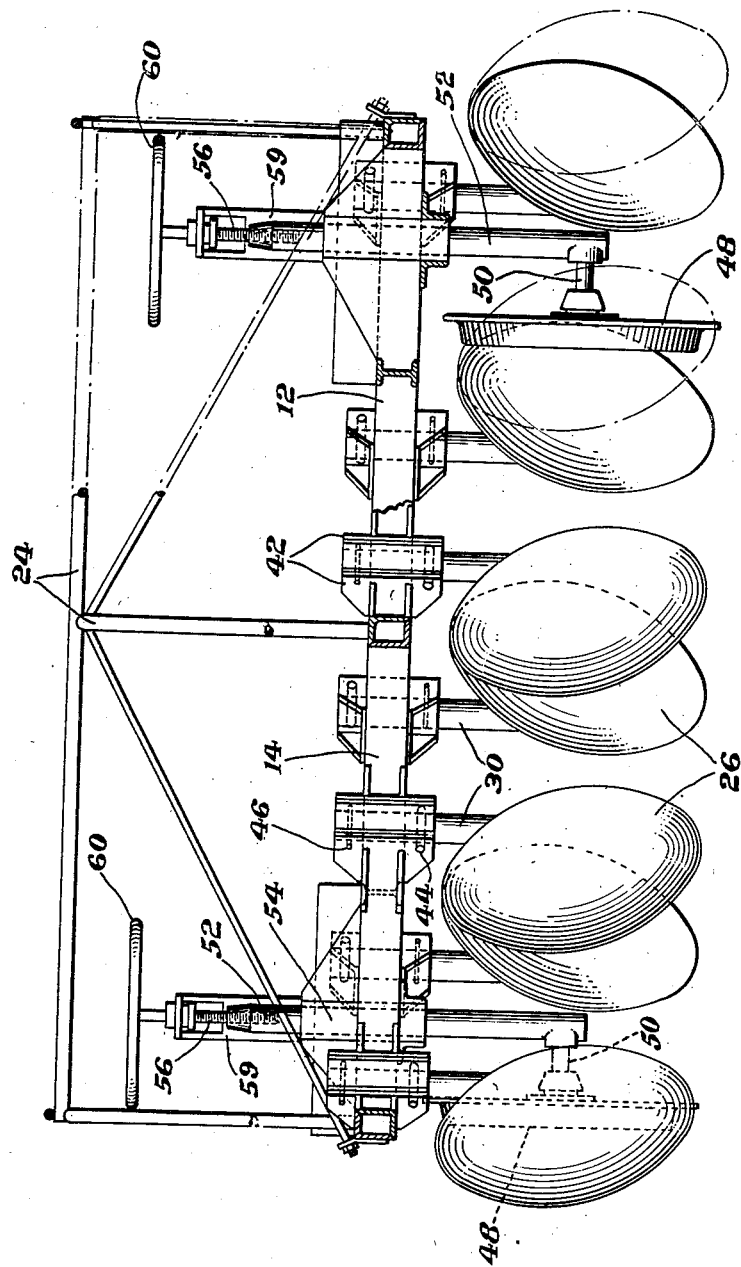

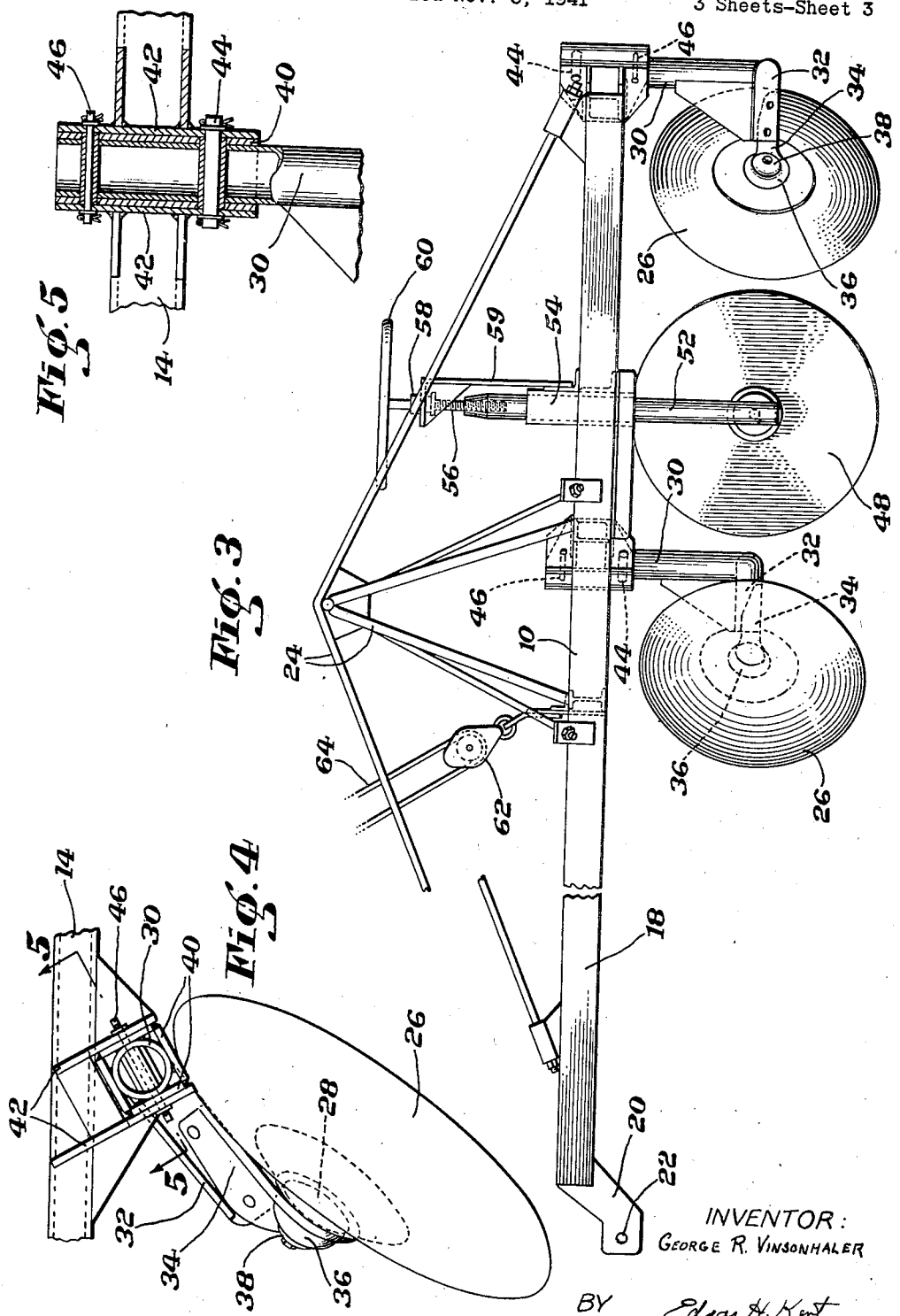

Patented Apr. 27, 1943

2,317,567

UNITED STATES PATENT OFFICE 2,317,567

PLOW

George R. Vinsonhaler, Wahiawa, Oahu, Territory of Hawaii, assignor to Hawaiian Pineapple Company, Limited, Honolulu, Territory of Hawaii, a corporation of Hawaii Application November 3, 1941, Serial No. 417,597

10 Claims. (Cl. 97—53)

The present invention relates to soil tilling instruments and more particularly to plows.

Objects of the invention are to provide a novel plow for turning over the soil preliminary to planting which is more efficient than prior plows in that, for a given amount of drawing power, it is capable of loosening and turning the soil more thoroughly and uniformly to greater depth and in a wider swath. A further object is to provide such a plow which pulverizes the soil yet leaves it in substantially its original location. Another object is to provide such a plow equipped with mechanism by which the depth of soil penetration may be adjusted and maintained uniform and which is constructed and arranged for attachment to, and operation by, usual types of tractors.

The foregoing and other objects and advantages of the invention will be made evident by the ensuing particular description of the preferred embodiment of the invention illustrated in the accompanying drawings, wherein:

Fig. 2 is a vertical section view on the line 2—2 of Fig. 1;

Fig. 3 is a side elevation of the plow shown in Figs. 1 and 2, with parts broken away;

Fig. 4 is a detail plan view of one of the plow discs of the front gang and its mounting;

Fig. 5 is a vertical section view on the line 5—5 of Fig. 4.

Figure 1:
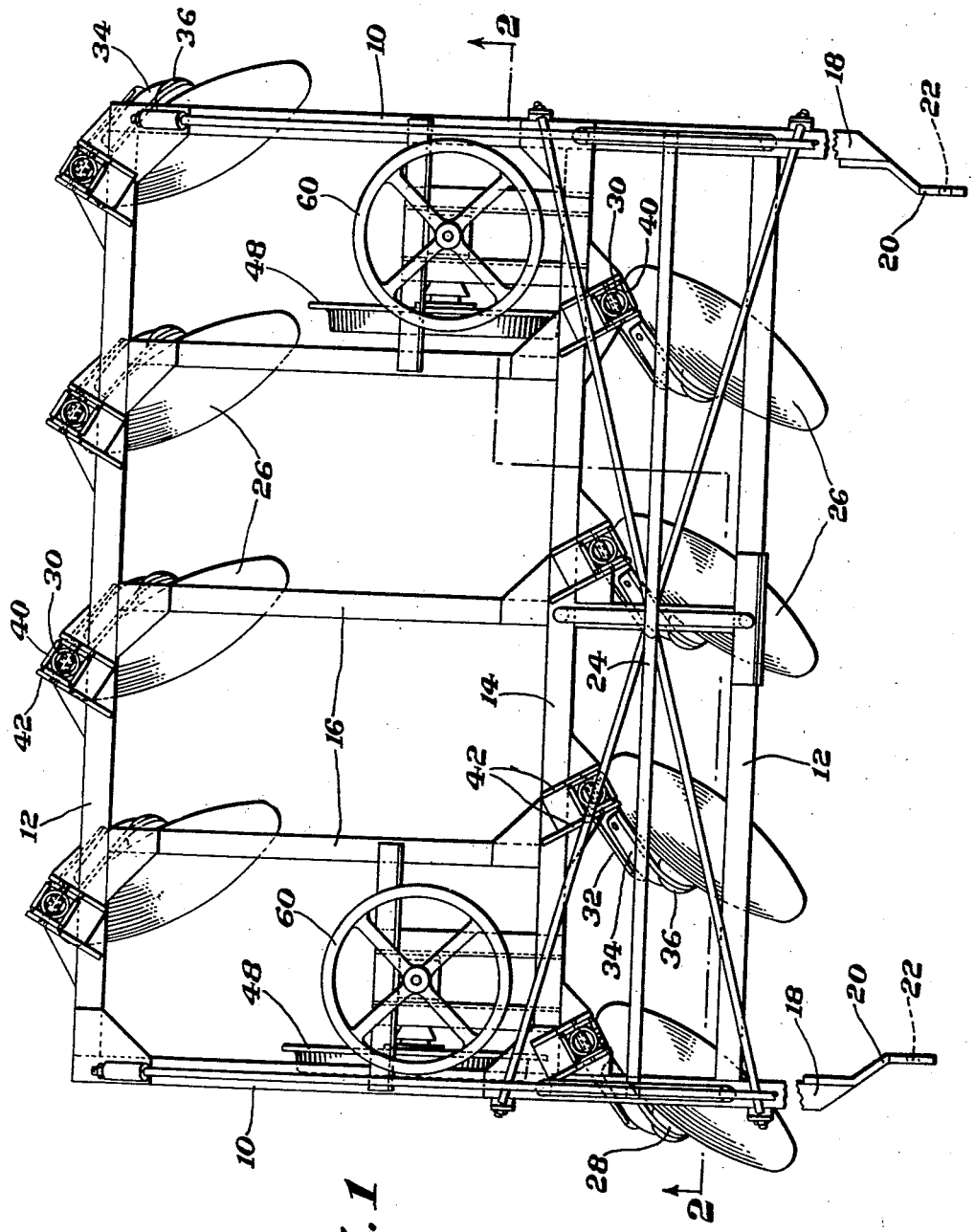
Fig. 1 is a top plan view of a plow of the invention, with certain parts broken away.

Referring now to the accompanying drawings, the plow as shown has a main frame of generally rectangular shape comprising longitudinal side bars 10, front and rear end cross bars 12, an intermediate cross bar 14 and intermediate longitudinal bars 16, these bars being of channel iron or similar heavy, durable construction and being rigidly interconnected in any suitable manner. Side bars 10 are provided with forward extensions 18 forming arms by which the plow may be connected to a traction device such as the conventional farm tractor, arms 18 being shown as provided on their front ends with flanges 20 having sockets 22 to receive attachment bolts or pins at opposite sides of a tractor. The frame is suitably reinforced by a truss framework 24.

Secured to depending supports at the front and rear ends respectively of the frame are a front and a rear transverse row or gang of steel plow discs 26. Discs 26 are all of the same concavo-convex shape and of the same size, and each is provided, on its convex side, with a projecting hub 28 coaxial with the disc. As shown in Fig. 1, the discs 26 of the front gang are mounted with their concave surface foremost and facing uniformly toward one side of the longitudinal axis of the frame, in a direction oblique to the direction of travel or draft of the plow, which latter direction is parallel to the side bars 10 of the frame. Also, as best viewed in Fig. 4, each disc 26 is inclined to the perpendicular, so that any portion of the disc below the disc axis is disposed forwardly of the corresponding portion above the axis.

The mountings for each of the discs 26 of the front gang comprise a post 30 secured to cross bar 14 of the frame and depending vertically therefrom, said post having, at its lower end, a horizontally extending arm 32 to which is bolted a bracket 34 having its outer end formed into a bearing sleeve 36, which rotatably receives the hub 28 of one of the discs 26, sleeve 36 being held on hub 28 by means of a hub cap 38, suitable roller bearings (not shown) being interposed between the sleeve and the hub. As best viewed in Fig. 4, sleeve 36 is arranged with its axis oblique to the direction of travel and inclined downwardly from front to rear, thus directing and inclining the disc face in the manner above described.

Posts 30, which are of circular cross section as shown, are provided at the top with a surrounding casing 40 of substantially square cross section, made up of four rectangular metal plates welded together at their edges and having their inner faces welded or otherwise firmly attached to the post. Casings 40 are each received between a pair of vertical bearing plates 42 fixed to the front of cross bar 14 and extending above and below the cross bar. Posts 30 are secured in normally fixed position between the plates 42 by means of pins 44 and 46 extending through registered apertures in the plates 42, casing 40 and post 30. Pin 44, which is located below cross bar 14 in the mountings for the discs of the front gang as shown in Figs. 3 and 5 is of considerably larger diameter and strength than the pin 46 located above the cross bar 14 in said mountings, the latter pin acting as a shear pin under certain circumstances hereinafter referred to.

It will be noted from the drawings that bearing plates 42 for the front gang of discs are set at approximately the same angle to the direction of draft as are the disc axes and that arms 32 and brackets 34 and sleeves 36 project outwardly from posts 30 at approximately a right angle to the plane of the plates 42, an arrangement which is advantageous in reducing strain on the disc mounting. It will also be noted that the arrangement of discs and mounting connections is such that so much of each disc mounting as is located below the plane of the upper edge of the disc is disposed behind and shielded by the disc. This is an important feature in the construction of the plow as it prevents interference by the mounting means with penetration of the soil by the discs to depths above the disc hubs, and permits unobstructed flow of the turned soil along the smooth concave faces of the discs.

The construction and arrangement of the discs 26 of the rear gang is the same as that of the front gang except that they face toward the opposite side of the plow frame at approximately the same oblique angle to the direction of draft as the discs of the front gang. The first three discs from one end of this rear gang (from the left hand end in Fig. 1) are positioned with their centers between the centers of corresponding pairs of the first three discs from the opposite end of the front gang (from the right hand end in Fig. 1). The diameter of the discs is such that each of these discs of the rear gang extends substantially across the longitudinal space between a pair of adjacent discs of the front gang.

The mounting connections for the discs of the rear gang are the same as those for the front gang of discs except for the position of some of the parts, each similarly including a vertical post 30 provided at its top with a casing 40 received between a pair of bearing plates 42 on the frame and fastened between said plates by pins 44 and 46, the post 30 having at its lower end a horizontally extending arm 32 and a bracket 34 fixed thereto and having a bearing sleeve 36 formed at its outer end which rotatably receives the hub 28 of one of the discs of the rear gang and is held thereon by a hub cap 38. In this case, the plates 42 are secured to rear cross bar 12 of the frame and project rearwardly therefrom at an angle of approximately 90° to the plates 42 of the front mountings, arms 32 extend from posts 30 toward the opposite side of the frame from that toward which the corresponding arms of the front mountings extend, and the position of pins 44 and 46 is reversed as compared with the front mountings, shear pin 46 being located below, and pin 44 above, the cross bar.

At opposite sides of the frame and depending therefrom between the front and rear gangs of plow discs, are located a pair of wheels 48 each rotatably mounted upon a horizontal stub axle 50 fixed to the lower end of a vertically extending post 52, each wheel being approximately aligned longitudinally with the axis of one of the discs 26 of the front gang. Posts 52 are each vertically slidably mounted in tubes 54 fixedly mounted upon opposite sides of the frame. Rotatably mounted in the top of each post 52 is a vertically extending worm shaft 56 projecting through a cooperating fixed worm collar 58 in a bracket 59 fixed to the frame, shaft 56 having fixed thereto, above collar 58, a hand wheel 60. Wheels 48 may thus be raised or lowered relative to the frame and discs 26, by turning hand wheels 60 in one direction or the other, to permit the discs 26 to enter the ground to a predetermined depth according as the wheels are raised above the plane of the lower edges of the discs, or to permit the plow to ride on the wheels 48 with the discs 26 clear of the ground by lowering the wheels below the plane of the lower edges of the discs.

In use, the plow may be drawn to the plowing location resting upon the wheels 48 in lowered position. By then adjusting the position of wheels 48 toward the frame, discs 26 will be caused to penetrate into the soil to a predetermined depth controlled by the position of wheels 48. As the plow is advanced, discs 26 rotate about their individual axes cutting and loosening the soil to the predetermined depth. The inclination of the discs to the perpendicular gives them a desirable scooping action and prevents the discs from riding up from the predetermined plowing depth. The facing of each disc relative to the direction of travel is such that a strip of ground of substantial width is overturned by each disc and caused to flow in a stream along the concave surface and past the rear edge of the disc, thus offering a minimum of resistance to the forward advance of the disc. The discs of the rear gang are positioned to act upon the strips of ground between the front discs so that all of the soil within the lateral span of the disc gangs is thoroughly pulverized and overturned. The opposite facing of the discs of the front and rear gangs acts to balance and substantially eliminate side thrust on the frame due to the side facing of the discs and also to fill the furrows cut by the discs of the front gang. The furrows formed by the discs of the rear gang remain, and these provide protection against soil erosion during that period between the completion of the plowing operation and the later harrowing and planting operations, provided, of course, the plowing is at right angles to the direction of slope of the land, as is conventional practice termed "contour plowing."

While the connection between posts 30 and the plow frame is sufficiently strong to withstand the pressure incident to plowing tough, hard soil, shear pins 46 function as a safety device in case any one of the discs encounters some unusual obstruction such as a rock ledge which prevents continued forward advance of the disc with the frame. In this event, shear pin 46, being the weakest link in the connection of the disc to the frame, breaks and the post 30 pivots rearwardly on the heavier pin 44, permitting the disc to ride up to the surface of the ground over the obstruction. A new pin 46 may then be readily inserted, and damage due to excessive strain on the discs, their mounting supports and the frame, is thus avoided. In the mountings for the discs of the front gang, pin 44 is located below, and pin 46 above, the supporting bar, cross bar 14, so that said bar, being located behind the posts 30, does not interfere with their pivoting rearwardly about the pins 44 in the desired manner. For the same reason, the position of pins 44 and 46 is reversed in the case of the rear gang of discs, as in this case the support bar, rear cross bar 12, is located in front of the posts 30 of this rear gang.

In some cases it is desirable to transport the plow with all its parts entirely clear of the soil. To this end, there is provided a pulley 62 anchored to the plow frame which receives a cable 64 arranged to be taken up by a suitable power operated winch (not shown) on the traction device. As the cable 64 is taken up by the winch, the plow is lifted from the ground, arms 18 pivoting on the pins or bolts which pass loosely through the sockets 22 to connect the arms and plow to the tractor.

In practice, I preferably incline the discs at an angle of about 20° to the perpendicular and face them at an angle of about 45° to the direction of draft, as shown. For plowing to depths of 14 inches, utilizing a tractor of normal drawing power for heavy plowing, I have obtained excellent results using eight plowing discs in the arrangement shown, each disc having a diameter of about thirty-two inches. With this arrangement I am able to plow, thoroughly and effectively, a swath more than ten feet in width to a depth of at least fourteen inches, even in tough, virgin soils, with a traction device of 95 H. P. draw bar rating.

Having illustrated and described a preferred embodiment of the invention, what I desire to claim and secure by Letters Patent is:

1. A plow comprising a frame, front and rear gangs of transversely spaced plowing discs rotatably connected to posts depending from said frame, said discs having a smooth concave front face free from obstructions and being disposed substantially entirely below the frame with their axes inclined downwardly from front to rear, the discs of said front gang being faced to one side of the direction of draft of the plow at an oblique angle thereto, the discs of said rear gang being faced to the opposite side of the direction of draft at an oblique angle thereto, the discs of said rear gang being arranged with their centers alternating transversely of the frame with the centers of the discs of said front gang, the mounting connections for each of said discs having such parts thereof as are below the plane of the upper edge of the disc located at the rear of the disc and within the confines of the path of the disc whereby to avoid interference by said connections with the free flow of soil past said discs, said discs and mounting connections being sufficiently strong to withstand the pressure incident to plowing soil with said discs penetrating at least ten inches into the soil.

2. A plow as described in claim 1 wherein there are four discs in each gang and each disc has a diameter of about thirty-two inches.

3. A plow as described in claim 1 wherein the angle of inclination of the disc axes to horizontal is about twenty degrees and the oblique angle of the discs to the direction of draft of the plow is about forty-five degrees.

4. A plow comprising a frame, front and rear gangs of transversely spaced plowing discs rotatably connected to posts depending from said frame, said discs being of substantially uniform size and concavo-convex shape and being disposed substantially entirely below the frame with their concave surface foremost and with their axes inclined downwardly from front to rear, the discs of said front gang being faced to one side of the direction of draft of the plow at an oblique angle thereto, the discs of said rear gang being faced to the opposite side of the direction of draft at an oblique angle thereto substantially equal to said first named angle, the discs of said rear gang being arranged with their centers alternating transversely of the frame with the centers of the discs of said front gang, the mounting connections for each of said discs having such parts thereof as are below the plane of the upper edge of the disc located at the rear of the disc and within the confines of the path of the disc, said discs and mounting connections being sufficiently strong to withstand the pressure incident to plowing soil with said discs penetrating at least ten inches into the soil.

5. A plow comprising a frame, front and rear gangs of transversely spaced plowing discs rotatably connected to posts depending from said frame, said discs having a smooth concave front face free from obstructions and being disposed substantially entirely below the frame with their axes inclined downwardly from front to rear, the discs of said front gang being faced to one side of the direction of draft of the plow at an oblique angle thereto, the discs of said rear gang being faced to the opposite side of the direction of draft at an oblique angle thereto, the discs of said rear gang being arranged with their centers alternating transversely of the frame with the centers of the discs of said front gang, the mounting connections for each of said discs having such parts thereof as are below the plane of the upper edge of the disc located at the rear of the disc and within the confines of the path of the disc whereby to avoid interference by said connections with the free flow of soil along the front faces of said discs, a pair of wheels rotatably connected to the frame and depending therefrom at opposite sides thereof between said front and rear gangs of discs, said wheels having their axes disposed transverse to the direction of draft of the plow, and means for adjusting the position of said wheels vertically relative to the frame, to an extent sufficient to shift said discs between an elevated position clear of the ground and a lowered position in which they penetrate the soil for at least half their depth.

6. A plow comprising a frame, front and rear gangs of transversely spaced plowing discs rotatably connected to said frame and depending therefrom, said discs having a smooth concave front face free from obstructions and being disposed with their axes inclined downwardly from front to rear, the discs of said front gang being faced to one side of the direction of draft of the plow at an oblique angle thereto, the discs of said rear gang being faced to the opposite side of the direction of draft at an oblique angle thereto, the discs of said rear gang being arranged with their centers alternating transversely of the frame with the centers of the discs of said front gang, the mounting connections for each of said discs having such parts thereof as are below the plane of the upper edge of the disc located at the rear of the disc and within the confines of the path of the disc and comprising a post secured to the frame and depending substantially vertically therefrom with its lower end disposed behind the rearmost part of the disc, an arm extending forwardly and laterally from said post adjacent the lower end thereof at substantially the same angle to the direction of draft as said disc is faced, a bearing sleeve on said arm and a hub fixed to the rear face of said disc and rotatably held in said sleeve.

7. In a disc plow, the combination with a frame of a disc support post fixed to the frame and depending therefrom in substantially vertical position, an arm extending forwardly and laterally from adjacent the lower end of said post at an oblique angle to the direction of draft of the plow, a bearing sleeve on said arm adjacent the outer end thereof, and a disc having a hub projecting centrally from its rear surface and rotatably held in said sleeve, said disc being faced at substantially said oblique angle to the direction of draft, said arm and the lower end of said post being located at the rear of the disc and within the confines of the path of the disc whereby to avoid interference thereof with the free flow of soil past said disc.

8. In a disc plow, the combination with a frame of a disc support post fixed to the frame and depending therefrom in substantially vertical position, an arm extending forwardly and laterally from adjacent the lower end of said post at an oblique angle to the direction of draft of the plow, a bearing sleeve on said arm adjacent the outer end thereof in an inclined position with its axis inclined downwardly from front to rear, and a disc having a hub projecting centrally from its rear surface and rotatably held in said sleeve, said disc being faced at substantially said oblique angle to the direction of draft with its axis substantially coincident with the axis of said sleeve, said arm and the lower end of said post being located at the rear of the disc and within the confines of the path of the disc whereby to avoid interference thereof with the free flow of soil past said disc.

9. In a disc plow, the combination with a frame including a cross beam, of a mounting for a plow disc comprising a pair of plates projecting from a side of said beam in laterally spaced relation, a disc support post having its upper end seated between said plates and depending below the frame, said post having a bearing sleeve adjacent its lower end for rotatably receiving the hub of a said disc, and a pair of pins fastened through said plates and the upper end of said post to support said post in fixed position between said plates, one of said pins being above the other, and one of said pins having a strength less than the other and such as to cause it to break, permitting said post to pivot on the other said pin, under rearward pressure on said plow disc in excess of a predetermined operating maximum pressure.

10. In a disc plow, the combination with a frame including a cross beam, of a mounting for a plow disc comprising a pair of plates projecting from a side of said beam in parallel relation and at an oblique angle to the angle of draft of the plow, a disc support post having its upper end seated between said plates and depending from the frame, an arm extending forwardly and laterally from adjacent the lower end of said post at an oblique angle to the direction of draft of the plow and at substantially a right angle to said plates, a bearing sleeve on said arm adjacent the outer end thereof, a disc having a hub projecting centrally from the rear surface and rotatably held in said sleeve, and a pair of pins fastened through said plates and the upper end of said post to support said post in fixed position between said plates, one of said pins being above the other, and one of said pins having a strength less than the other and such as to cause it to break, permitting said post to pivot on the other said pin, under rearward pressure on said plow disc in excess of a predetermined operating maximum pressure.

GEORGE R. VINSONHALER.